(No Model.) 2 Sheets—Sheet 2.

W. SCOTT.
STOPPING AND REVERSING MECHANISM FOR PRINTING PRESSES.

No. 460,994. Patented Oct. 13, 1891.

Witnesses
C. E. Ashley
H. W. Lloyd

Walter Scott
Inventor

By his Attorney
Henry Melville

UNITED STATES PATENT OFFICE.

WALTER SCOTT, OF PLAINFIELD, NEW JERSEY.

STOPPING AND REVERSING MECHANISM FOR PRINTING-PRESSES.

SPECIFICATION forming part of Letters Patent No. 460,994, dated October 13, 1891.

Application filed April 21, 1891. Serial No. 389,828. (No model.)

*To all whom it may concern:*

Be it known that I, WALTER SCOTT, of Plainfield, in the county of Union and State of New Jersey, have invented a new and useful Improvement in Stopping and Reversing Mechanism for Printing-Presses and other Machines, of which the following is a full, clear, and exact description, such as will enable others skilled in the art to make and use the same, reference being had to the accompanying drawings, and to the letters of reference marked thereon, which form a part of this specification.

The said drawings show the application of my invention to the shaft of an ordinary printing-press; but it is not confined to machines of this kind, but is applicable to machinery generally wherever a simple, cheap, and efficient mechanism for reversing its motion is desired.

Figure 1:
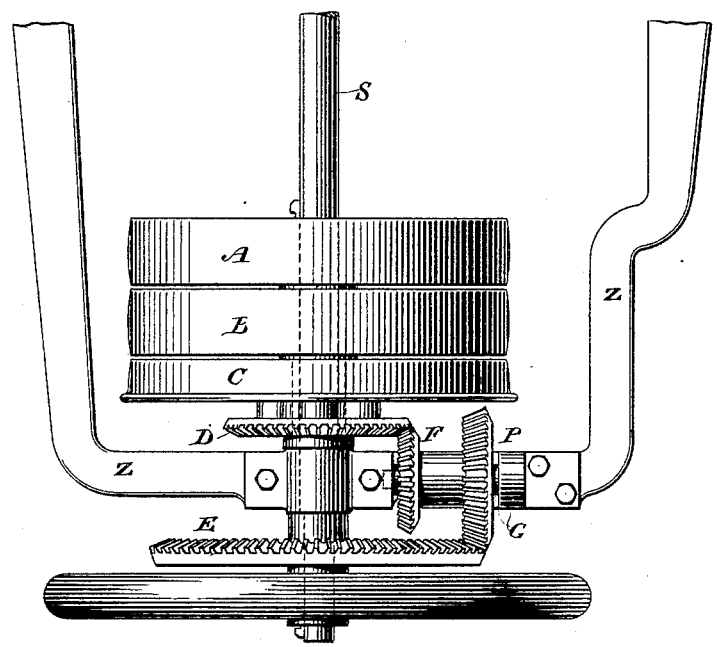
Figure 2:
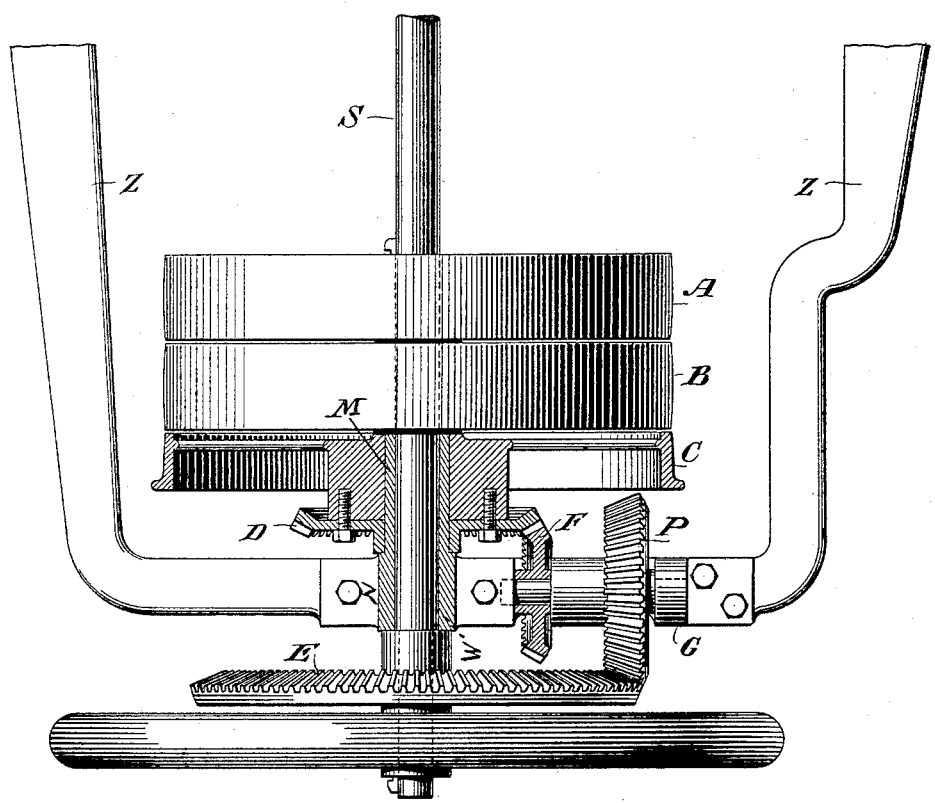

In the accompanying drawings, Figure 1 represents a horizontal view of the construction of my device, and Fig. 2 a view partly in section.

Z represents the frame of the press, and S the main driving-shaft supported on suitable bearings. Upon this driving-shaft S are three band-pulleys A, B, and C. A is fixed to the shaft S, B is loose upon it, and C is also loose, revolving to save friction not upon the shaft, but upon a sleeve M, inclosing it, which may be a part of the journal box N, as shown, or, if preferred, a part of the hub of the loose pulley B. Bolted or otherwise firmly attached to pulley C is the bevel gear-wheel D, and fixed to the end of the shaft is the bevel gear-wheel E. A band is shifted from one pulley to another by any of the ordinary devices. When the band is on the pulley A, it will turn the shaft S and impart a forward motion to the machine. When the band is shifted to B, the pulley alone turns and the machine stops. When the band is shifted to pulley C, the gear-wheel D is revolved and a reverse motion given to the shaft S through the connection of the gear-wheel D with the gear-wheel E by a proper system of bevel gearing. This gearing is so arranged as to make the reverse motion slower than the direct, which is often desirable.

The accompanying drawings show such system of gearing. D meshes with the pinion F, which, joined to a similar but larger pinion P, is loose upon the frame of the machine at G. It is obvious that the result would be the same if in place of F, P, and G there was substituted a short shaft with similar pinions fixed upon it. The bevel gear-wheel E on the end of the shaft meshes with P. If the pulley A and through it the shaft S is moved from left to right when the band is shifted to the pulley C, the gear-wheel D will move from left to right, and by means of the bevel-pinions F and P the gear-wheel E will be turned from right to left, thereby reversing the motion of the shaft S. A slower reverse speed is obtained by having the ratio of the number of the cogs in E to that in P greater than the ratio of that in D to that in F.

It is evident that the pulleys A, B, and C may be exchanged for gears, either friction or toothed, a movable friction-pulley or toothed pinion being arranged to engage with either according to adjustment.

Having thus described my invention and its mode of operation, what I claim as new, and desire to secure by Letters Patent, is—

The combination, with the driving-shaft, of a fixed and loose pulley, another loose pulley having a bevel gear-wheel D fixed thereto, a bevel gear-wheel E, permanently fixed to the shaft, and two bevel-pinions F and P, F meshing with D and P with E, so constructed that the ratio of the number of cogs in the wheel on the shaft to the number of cogs in P shall be greater than that of the number of cogs in the wheel on the pulley to the number of cogs in F, as and for the purposes described.

Dated New York, April 18, 1891.

WALTER SCOTT.

In presence of—
PERCIVAL C. SMITH,
WM. J. CONNELL.